United States Patent
Leslie et al.

(10) Patent No.: US 12,187,420 B2
(45) Date of Patent: Jan. 7, 2025

(54) OPTIMISED NOZZLE GEOMETRY

(71) Applicant: Genesis Aerotech Limited, Fintona (GB)

(72) Inventors: Martin Leslie, Fintona (GB); Patrick Mallon, Fintona (GB); Michael Rice, Fintona (GB)

(73) Assignee: Genesis Aerotech Limited, County Tyrone (GB)

( * ) Notice: Subject to any disclaimer, the term of this patent is extended or adjusted under 35 U.S.C. 154(b) by 0 days.

(21) Appl. No.: 17/635,122

(22) PCT Filed: Aug. 12, 2020

(86) PCT No.: PCT/EP2020/072680
§ 371 (c)(1),
(2) Date: Feb. 14, 2022

(87) PCT Pub. No.: WO2021/028508
PCT Pub. Date: Feb. 18, 2021

(65) Prior Publication Data
US 2022/0306309 A1    Sep. 29, 2022

(30) Foreign Application Priority Data
Aug. 12, 2019 (GB) ................................ 1911520

(51) Int. Cl.
*B64C 27/18*    (2006.01)
*B05B 1/00*    (2006.01)
(Continued)

(52) U.S. Cl.
CPC .............. *B64C 27/18* (2013.01); *B05B 1/005* (2013.01); *B64C 9/16* (2013.01); *B64D 27/00* (2013.01); *F15D 1/04* (2013.01); *F15D 1/08* (2013.01)

(58) Field of Classification Search
CPC ........ B64C 27/18; B64D 33/04; B64D 27/00; B05B 1/005; F15D 1/04; F15D 1/08
See application file for complete search history.

(56) References Cited

U.S. PATENT DOCUMENTS 3,120,274 A    2/1964  Irbitis
6,290,266 B1   9/2001  Kawano
(Continued)

FOREIGN PATENT DOCUMENTS

EP    0940585 A1    9/1999
EP    2204318 A1    7/2010
(Continued)

OTHER PUBLICATIONS

Machine Translation of WO-2011096850-A1, Bormotov A G, Aug. 2011 (Year: 2011).*
(Continued)

*Primary Examiner* — Tien Q Dinh
*Assistant Examiner* — Katherine June Bolek
(74) *Attorney, Agent, or Firm* — Kenner Renner; Arthur M. Reginelli

(57) ABSTRACT

A compressed gas ejection assembly for a rotating wing aircraft blade comprising a compressed gas passage adapted to allow a substantially constant mass flow through the compressed gas ejection assembly across at least a portion of the width of the compressed gas ejection assembly.

18 Claims, 7 Drawing Sheets

(51) Int. Cl.
    *B64C 9/16*         (2006.01)
    *B64D 27/00*      (2006.01)
    *F15D 1/04*        (2006.01)
    *F15D 1/08*        (2006.01)

(56) References Cited

U.S. PATENT DOCUMENTS

| | | | |
|---|---|---|---|
| 11,565,793 B2 * | 1/2023 | Zhu | B64C 27/06 |
| 2009/0206208 A1 | 8/2009 | Kennedy et al. | |
| 2015/0367934 A1 * | 12/2015 | White | B64C 27/18 |
| | | | 244/17.11 |
| 2017/0197708 A1 | 7/2017 | White | |

FOREIGN PATENT DOCUMENTS

| | | | | |
|---|---|---|---|---|
| WO | WO-2011096850 A1 * | 8/2011 | ............ | B64C 27/18 |
| WO | WO-2014075706 A1 * | 5/2014 | ............ | B64C 27/14 |

OTHER PUBLICATIONS

International Search Report and Written Opinion for corresponding PCT/EP2020/072680 dated Nov. 20, 2020 (14 pp).

* cited by examiner

Section A-A'
(PRIOR ART)

Section B-B'
(PRIOR ART)

Section A-A'

Section B-B'

Section C-C'

Section D-D'

Section E-E'

OPTIMISED NOZZLE GEOMETRY

The present invention relates to helicopters. In particular, the present invention relates to the propulsion of 'tip jet' or reaction jet helicopters.

In reaction jet helicopters, an engine-driven compressor produces compressed air which is ejected through ejection means such as jet nozzles at the tips of the rotor blades. This causes the rotor blades to rotate, thereby producing lift and thrust for the aircraft. Reaction jet helicopters provide advantages over conventional shaft-driven helicopters since they do not require tail rotors or drive shafts which would need to be decoupled during autorotation. However, significant problems arise in existing reaction jet helicopters due to turbulence created by the rotor blades. High velocity compressed air jets which generate significant levels of noise and drag are needed to provide jet thrust and lift. Prior art compressed gas ejection means through which compressed air is ejected typically use apertures of uniform cross section, such apertures having a fixed height across their entire width. Variations in the velocity and mass flow of the compressed gas ejected through such apertures creates significant shear in the jet efflux resulting in increased turbulence and energy loss.

It is an object of the invention to obviate or mitigate the problems outlined above. In particular, it is an object of the invention to reduce turbulence produced by reaction jet helicopter blades.

In particular, it is an object of the invention to reduce turbulence caused by the geometry of compressed gas ejection means.

It is a further object of the invention to provide a reaction jet helicopter which ejects compressed air in a more efficient manner.

It is a further object of the invention to provide a reaction jet helicopter which produces lower levels of noise during operation.

It is a further object of the invention to provide a reaction jet helicopter which wastes less energy during operation.

It is a further object of the invention to provide a more efficient compressed gas ejection means.

According to an aspect of the invention there is provided a compressed gas ejection means for a rotating wing aircraft blade, the compressed gas ejection means comprising a compressed gas passage means, the compressed gas passage means being adapted to allow a substantially constant mass flow through the compressed gas ejection means across at least a portion of the width of the compressed gas ejection means. Advantageously, the use of a compressed gas passage means which allows a substantially constant mass flow reduces the amount of shear in the jet efflux, thereby reducing turbulence and energy loss in the jet efflux as well as the noise levels during use of the aircraft.

Ideally the compressed gas ejection means is located on a blade of a rotating wing aircraft.

Preferably the rotating wing aircraft blade has an aerofoil/airfoil-shaped cross section.

Preferably the rotating wing aircraft blade comprises distal, leading and trailing edges.

Preferably the distal edge is that which, in use, is furthest from the body of the rotating wing aircraft.

Preferably the rotating wing aircraft blade comprises a proximal edge opposite the distal edge. Preferably the proximal edge is that which, in use, is closest to the body of the rotating wing aircraft and may be attached or adjacent to a distributor hub.

Preferably the leading edge is the foremost edge of the aerofoil/airfoil.

Preferably the trailing edge is the rear edge of the blade, opposite the leading edge.

Preferably the compressed gas ejection means is located on the trailing edge of the rotating wing aircraft blade.

Preferably the compressed gas ejection means is located at or near the distal edge of the rotating wing aircraft blade.

Preferably the compressed gas ejection means is a compressed gas discharge means.

Preferably the compressed gas ejection means is a compressed gas discharge means for discharging compressed gas from the blade.

Preferably the mass flow is a mass flow of compressed gas.

Preferably the flow of compressed gas has a mass flow rate.

Preferably the rotating wing aircraft blade has a longitudinal axis.

Preferably the longitudinal axis of the rotating wing aircraft blade extends in a direction which is substantially parallel to the longest dimension of the rotating wing aircraft blade.

Preferably the longitudinal axis of the rotating wing aircraft blade extends from the proximal edge to the distal edge.

Preferably the rotating wing aircraft blade comprises an interior fluid passage for compressed gas.

Preferably the interior fluid passage of the rotating wing aircraft blade extends in a direction which is substantially parallel to the longitudinal axis of said blade.

Preferably the rotating wing aircraft blade has a rotation plane.

Preferably, in use, the rotating wing aircraft blade rotates within the rotation plane.

Preferably the flow of compressed gas through the interior fluid passage of the rotating wing aircraft blade is towards the distal edge of said rotating wing aircraft blade.

Preferably the compressed gas ejection means has a height dimension.

Preferably the compressed gas passage means has a height dimension.

Preferably the height dimension of the compressed gas ejection means and/or the compressed gas passage means extends in a direction which is substantially perpendicular to the rotation plane.

Preferably the height dimension of the compressed gas ejection means and/or the compressed gas passage means extends in a direction which is substantially perpendicular to the direction of flow of compressed gas through the interior fluid passage of the rotating wing aircraft blade, and substantially perpendicular to the direction of flow of compressed gas through the compressed gas ejection means.

Preferably the compressed gas ejection means has a width dimension.

Preferably the compressed gas passage means has a width dimension.

Preferably the width dimension of the compressed gas ejection means and/or the compressed gas passage means extends in a direction which is substantially parallel to the direction of flow of compressed gas through the interior fluid passage of the rotating wing aircraft blade.

Preferably the width dimension of the compressed gas ejection means and/or the compressed gas passage means extends in a direction which is substantially parallel to the longitudinal axis of the rotating wing aircraft blade.

Preferably the compressed gas ejection means has a depth dimension.

Preferably the compressed gas passage means has a depth dimension.

Preferably the depth dimension of the compressed gas ejection means and/or the compressed gas passage means extends in a direction which is substantially parallel to the direction of flow of compressed gas through the compressed gas ejection means.

Preferably the compressed gas passage means is a fluid passage for compressed gas.

Preferably the compressed gas passage means is a fluid passage for compressed gas to exit the rotating wing aircraft blade.

Ideally the compressed gas passage means is at least one fluid path for compressed gas to pass through the compressed gas ejection means.

Preferably the compressed gas passage means comprises at least one compressed gas entrance. Advantageously, compressed gas is able to pass into the compressed gas passage means via the at least one compressed gas entrance.

Preferably the compressed gas passage means comprises at least one compressed gas exit. Advantageously, compressed gas is able to pass out of the compressed gas passage means via the at least one compressed gas exit.

Ideally the compressed gas passage means comprises at least one compressed gas entrance and at least one compressed gas exit.

Preferably compressed gas is able to flow through the compressed gas passage means via the or each compressed gas entrance and the or each compressed gas exit.

Preferably the compressed gas passage means comprises at least one fluid channel.

Preferably the compressed gas passage means comprises a plurality of fluid channels.

Preferably the or each fluid channel provides a fluid communication path between the compressed gas entrance and the compressed gas exit.

Preferably the at least one compressed gas entrance is in fluid communication with the at least one compressed gas exit via the at least one fluid channel.

Preferably compressed gas is able to pass from the at least one compressed gas entrance to the at least one compressed gas exit via the at least one fluid channel.

Preferably the at least one compressed gas entrance is in fluid communication with the at least one compressed gas exit via one fluid channel.

Preferably the at least one compressed gas entrance is in fluid communication with the at least one compressed gas exit via a plurality of fluid channels.

Preferably the compressed gas ejection means comprises a body.

Preferably the compressed gas ejection means comprises a body in which the compressed gas passage means is formed.

Preferably the compressed gas passage means passes through the compressed gas ejection means body.

Optionally the body of the compressed gas ejection means is a plate.

Preferably the compressed gas ejection means is a plate in which the or each fluid channel is formed.

Preferably the plate is curved or flat.

Preferably the compressed gas passage means is formed in the body of the compressed gas ejection means.

Preferably the or each fluid channel is an aperture.

Preferably the compressed gas ejection means comprises a plurality of apertures.

Preferably the compressed gas passage means comprises one or more fluid channels formed in the body of the compressed gas ejection means.

Preferably the or each fluid channel passes through the body.

Ideally the compressed gas passage means comprises at least one aperture.

Preferably the compressed gas passage means comprises a plurality of apertures.

Preferably compressed gas is able to flow through the compressed gas ejection means via the or each aperture.

Preferably the at least one compressed gas entrance, the at least one compressed gas exit, and the at least one fluid channel is provided by at least one aperture passing through the body of the compressed gas ejection means.

Preferably the compressed gas ejection means comprises at least one nozzle.

Ideally the compressed gas ejection means comprises a converging-diverging nozzle.

Preferably the or each fluid channel is a nozzle.

Preferably the or each fluid channel is a converging-diverging nozzle.

Preferably the height of the one or more fluid channels varies over the width of the converging-diverging nozzle.

Preferably the height of the one or more fluid channels varies over the depth of the converging-diverging nozzle.

Preferably the height of the or each fluid channel varies over the depth of the compressed gas ejection means.

Optionally the compressed gas entrance and/or compressed gas exit is/are rectangular openings in the body of the compressed gas ejection means.

Optionally the compressed gas entrance and/or compressed gas exit is/are tapered openings in the body of the compressed gas ejection means corresponding to the shape of the fluid channel.

Optionally the compressed gas entrance and/or compressed gas exit is/are trapezoidal openings in the body of the compressed gas ejection means corresponding to the shape of the fluid channel.

Preferably the compressed gas entrance and compressed gas exit are connected by upper, lower, inboard-side and outboard-side nozzle surfaces.

Preferably upper, lower, inboard-side and/or outboard-side nozzle surfaces are flat or curved.

Preferably the upper, lower, inboard-side and outboard-side nozzle surfaces provide a smooth path for compressed gas.

Ideally the compressed gas passage means comprises one fluid channel per blade.

Ideally the compressed gas passage means comprises a plurality of fluid channels per blade.

Preferably the or each fluid channel is defined by at least one surface.

Preferably the or each fluid channel is defined by a plurality of surfaces.

Preferably the or each fluid channel is defined by four surfaces.

Preferably the or each fluid channel is defined by at least a upper longitudinal surface, a lower longitudinal surface, an outboard side surface and an inboard side surface.

Preferably the or each of the upper and lower longitudinal surfaces adjoin the or each of the outboard side surfaces and the inboard side surfaces.

Preferably the or each outboard side surface is smaller than the or each inboard side surface.

Preferably the height of the or each fluid channel increases with increasing distance from the outboard side surface.

Preferably one or both of the upper and lower longitudinal surfaces are flat.

Preferably at least one of the upper and lower longitudinal surfaces is flat.

Optionally one or both of the upper and lower longitudinal surfaces are curved.

Optionally at least one of the upper and lower longitudinal surfaces is curved.

Optionally one or both of the upper and lower longitudinal surfaces are curved in a concave or convex manner.

Optionally at least one of the upper and lower longitudinal surfaces is curved in a concave or convex manner.

Preferably the corners between the adjoining surfaces are smooth or rounded.

Preferably the height of the or each fluid channel corresponds to the distance between the upper and lower longitudinal surfaces.

Optionally the compressed gas passage means comprises at least one pillar.

Preferably the or each pillar extends between the upper and lower longitudinal surfaces.

Preferably the or each pillar is located within the compressed gas passage means between the compressed gas entrance and the compressed gas exit.

Ideally the distance between the upper and lower longitudinal surfaces decreases gradually and continuously from the inboard side of the compressed gas ejection means to the outboard side of the compressed gas ejection means Preferably the width of the or each fluid channel corresponds to the distance between the outboard side and inboard side surfaces.

Preferably the outboard side and inboard side surfaces are substantially parallel.

Preferably the compressed gas ejection means extends from an outboard side to an inboard side.

Preferably the outboard side of the compressed gas ejection means is located proximal to the distal end of the blade.

Preferably the compressed gas passage means is formed to provide a greater mass flow resistance towards the outboard side compared to the inboard side Ideally the distance between the upper and lower longitudinal surfaces is smaller towards the outboard side of the compressed gas ejection means compared to the inboard side of the compressed gas ejection means.

Preferably the compressed gas passage means is adapted to allow a substantially constant mass flow through the compressed gas ejection means across substantially the entire width of the compressed gas passage means.

Ideally the one or more fluid channels are adapted to allow a substantially constant mass flow through the compressed gas ejection means across substantially the entire width of the compressed gas ejection means.

Preferably the or each fluid channel is shaped to allow a substantially constant mass flow through the compressed gas ejection means across the full width of the or each fluid channel.

Ideally the mass flow resistance of the compressed gas passage means varies across at least part of the width of the compressed gas ejection means.

Preferably the compressed gas passage means is formed to vary the mass flow resistance across at least part of the width of the compressed gas ejection means.

Preferably the compressed gas passage means is formed to provide a greater mass flow resistance at the outboard side of the compressed gas ejection means compared to the inboard side.

Preferably the or each fluid channel is formed to provide a greater mass flow resistance at the outboard side of the compressed gas ejection means compared to the inboard side.

Preferably the cross section of the compressed gas passage means is asymmetric.

Preferably the cross section of the compressed gas passage means is trapezoidal.

Preferably the height of the compressed gas passage means is asymmetric.

Preferably the height of the compressed gas passage means varies across the width of the compressed gas passage means.

Preferably the height of the compressed gas passage means increases with distance along a direction which is substantially parallel to the longitudinal axis of the blade.

Ideally the height of the compressed gas passage means increases with distance from an outboard side of the compressed gas ejection means.

Ideally the height of the compressed gas passage means decreases with distance from an inboard side of the compressed gas ejection means.

Preferably the height of the compressed gas passage means decreases gradually and continuously from the inboard side of the compressed gas ejection means to the outboard side of the compressed gas ejection means.

Preferably the or each fluid channel is asymmetric.

Preferably the cross section of the or each fluid channel is asymmetric.

Preferably the height of the or each fluid channel is asymmetric.

Preferably the or each fluid channel has a trapezoidal cross section.

Preferably the height of the or each fluid channel varies across the width of the compressed gas ejection means.

Preferably the height of the or each fluid channel varies across the width of the or each fluid channel.

Preferably the height of the or each fluid channel increases with distance along a direction which is substantially parallel to the longitudinal axis of the blade.

Preferably the or each fluid channel is narrower at the outboard side compared to the inboard side.

Preferably the direction of flow of compressed gas through and/or out of the compressed gas ejection means is substantially perpendicular to the direction of flow of compressed gas through the interior fluid passage for compressed gas.

Ideally the or each blade comprises a guide means.

Ideally the or each guide means is adapted to guide a flow of compressed gas from the or each interior fluid passage to the or each compressed gas ejection means.

Preferably the guide means comprises a guide means entrance in fluid communication with the interior fluid passage for compressed gas.

Preferably the guide means comprises a guide means exit in fluid communication with the compressed gas ejection means.

Preferably the guide means comprises a guide means exit in fluid communication with the compressed gas passage means.

Ideally the guide means comprises one or more guide walls.

Preferably the one or more guide walls define a plurality of guide channels.

Preferably the one or more guide walls define at least four guide channels.

Preferably the guide walls are equally spaced.

Preferably the or each guide wall is curved along a path having a fixed radius of curvature.

Optionally the or each guide wall is curved along a path having a variable radius of curvature.

Preferably the or each guide wall is curved along a path having a fixed or variable radius of curvature from the centre point for each arc.

Preferably the or each guide wall has a turning angle of 90 degrees.

Preferably all of the lateral guide walls share a single common centre point for each arc.

Preferably each lateral guide wall extends between an upper wall of the guide means and a base wall of the guide means.

Preferably the distance between the upper wall of the guide means and the lower wall of the guide means allows a substantially constant mass flow across the width of the guide means exit.

Preferably the distance between the upper wall of the guide means and the lower wall of the guide means at the guide means exit corresponds to the shape of the passage means.

Preferably the distance between the upper wall of the guide means and the lower wall of the guide means at the guide means entrance is constant or corresponds to the dimensions of the passage means.

Preferably the compressed gas ejection means is integrally formed with the guide means exit. Advantageously, the compressed gas ejection means being integrally formed with the guide means exit reduces the complexity of the overall system.

Preferably the distance between the upper wall of the guide means and the base wall of the guide means is varied along the guide means.

Preferably the distance between the upper wall of the guide means and the base wall of the guide means varies with distance from a fixed point.

Preferably the distance between the upper wall of the guide means and the lower wall of the guide means decreases with distance from a fixed point.

Preferably the fixed point is the shared common centre point for each arc of the lateral side walls.

According to further aspect there is provided a rotating wing aircraft blade comprising a compressed gas ejection means.

According to another aspect there is provided a rotating wing aircraft comprising at least one rotating wing aircraft blade.

Ideally the rotating wing aircraft is a reaction jet helicopter.

Ideally the rotating wing aircraft comprises at least one blade.

Ideally the rotating wing aircraft comprises a plurality of blades.

According to a further aspect of the invention there is provided a guide means for a rotating wing aircraft blade, the guide means being adapted to allow a substantially constant mass flow through the guide means. Advantageously, the use of a guide means which allows a substantially constant mass flow reduces the amount of shear in the jet efflux.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The invention will now be described with reference to the accompanying drawings which shows by way of example only one embodiment of an apparatus in accordance with the invention.

FIG. 7b shows a section through the compressed gas ejection assembly of FIG. 7a.

FIG. 7c shows a further section through the compressed gas ejection of FIG. 7a.

FIG. 7d shows a yet further section through the compressed gas ejection assembly of FIG. 7a.

Figure 1:
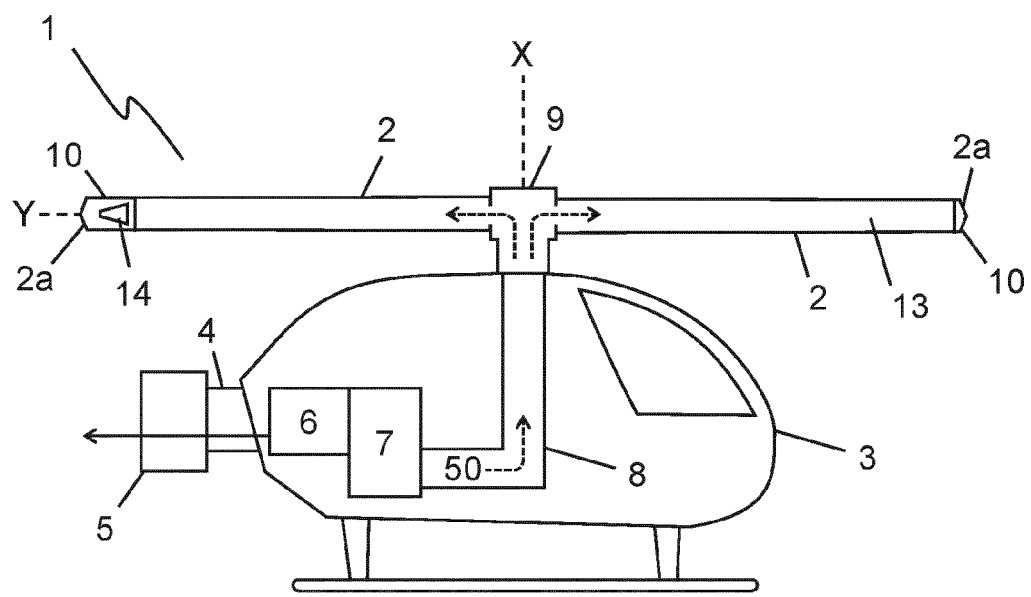
FIG. 1 shows a rotating wing aircraft comprising a compressed gas ejection assembly according to an aspect of the invention.

In FIG. 1 there is shown a rotating wing aircraft according to an embodiment of the invention indicated generally by reference numeral 1. The rotating wing aircraft 1 is a reaction jet helicopter comprising a fuselage 3, engine 6, tail boom 4 and rudder 5. The rotating wing aircraft's propulsion system comprises compressor 7, main conduit 8, distributor hub 9, rotor blades 2 and compressed gas ejection assemblies 10 located on the rotor blades 2 towards the distal ends 2a thereof. Each blade 2 has a longitudinal axis Y which is substantially parallel to the longest dimension of the blade 2. In use, engine 6 drives compressor 7 to produce compressed air 50 which travels via main conduit 8 and distributor hub 9 into the interior fluid passages 13 within rotor blades 2.

Figure 2:
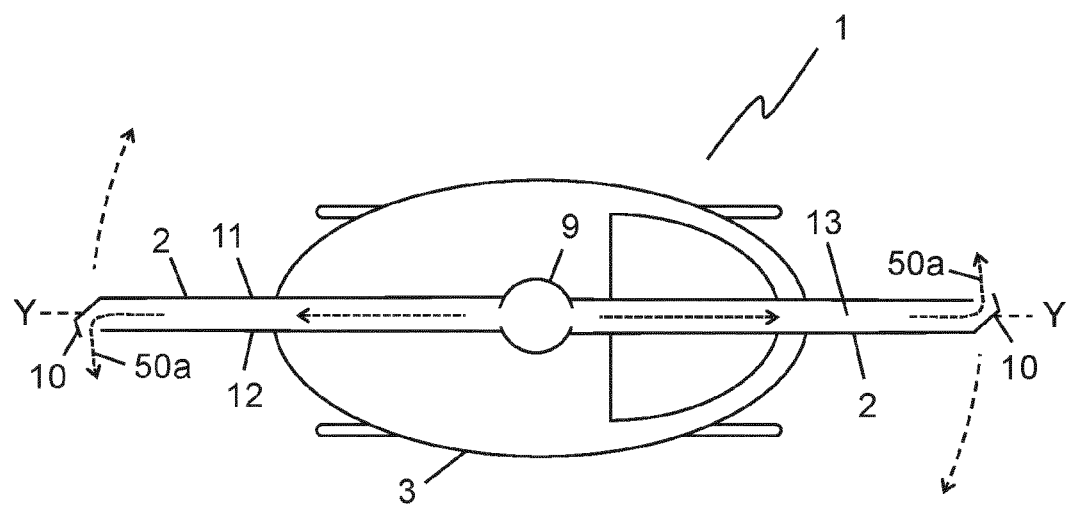
FIG. 2 shows is a top view of the rotating wing aircraft of FIG. 1.

FIG. 2 is a top view of aircraft 1 showing the direction of gas flow through the interior fluid passages 13 and out through compressed gas ejection assemblies 10. The release of compressed gas from the tip 2a of each rotor blade 2 provides a force which pushes the blades 2 in a direction opposite to that of the expelled gas stream 50a. Since the rotor blades 2 are rotatably mounted with respect to the fuselage 3, each rotor blade 2 traces a circular path about an axis X and rotates within a rotation plane (FIG. 2). Each rotor blade 2 has an airfoil cross section which, when rotated, provides aircraft lift as well as side, forward and aft propulsive force. In use, i.e. during flight while the rotor blades 2 rotate, compressed gas ejection assemblies 10 are located on a trailing edge 12 of each rotor blade 2. During operation, the exhaust from engine 6 is directed over rudder 5 to provide directional control of aircraft 1.

Figure 3:
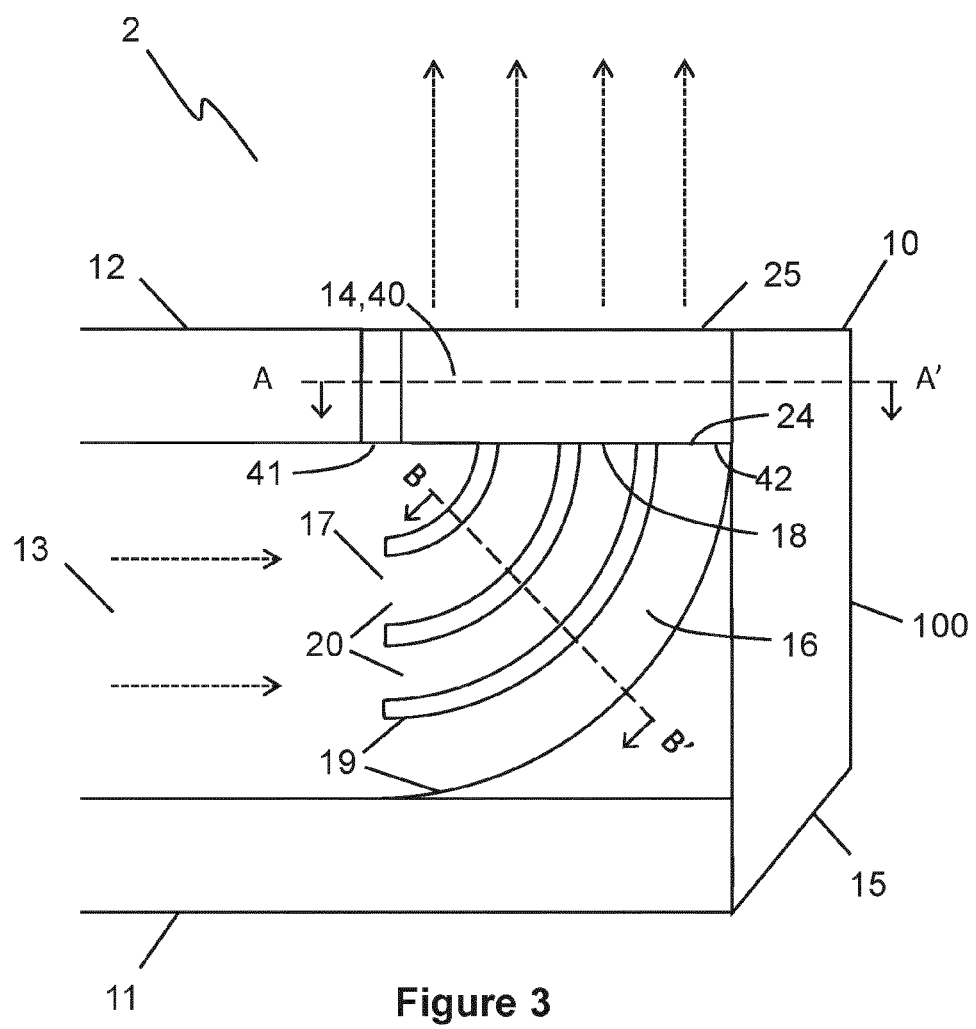
FIG. 3 shows a cross section through the tip of a rotor blade comprising a compressed gas ejection assembly according to the invention.

FIG. 3 shows a cross section through the distal end 2a of a rotor blade 2. The rotor blade 2 comprises a leading edge 11, a trailing edge 12, an interior fluid passage for compressed gas 13, and a compressed gas ejection assembly 10 comprising wing tip assembly 15 and compressed gas passage 14 through which compressed gas can flow out of the rotor blade 2. As will be explained below, the compressed gas passage 14 is adapted to allow a substantially constant mass flow through the compressed gas ejection assembly 10 across a portion of the width of the compressed gas ejection assembly 10. The compressed gas ejection assembly 10 is located on the trailing edge 12 of the rotor blade 2 towards the distal end 2a.

As shown in FIG. 3, the compressed gas passage 14 comprises a compressed gas entrance 24 and a compressed gas exit 25 through which compressed gas is able to pass into/out of the compressed gas passage 14. The compressed gas passage 14 comprises a fluid channel 40 which provides a fluid communication path between the compressed gas entrance 24 and the compressed gas exit 25. The compressed gas passage 14 is formed in the body 100 of the compressed gas ejection assembly 10.

The compressed gas ejection assembly 10 and the compressed gas passage 14 have height, width and depth dimensions. Height dimensions are denoted as extending in a direction which is substantially perpendicular to the rotation plane of the blades 2, substantially perpendicular to the direction of flow of compressed gas through the interior fluid passages 13, and substantially perpendicular to the direction of flow of compressed gas through the compressed gas ejection assembly 10 (i.e. substantially parallel to axis X in FIG. 1). Width dimensions are denoted as extending in a direction which is substantially parallel to the direction of flow of compressed gas through the interior fluid passages 13 and substantially parallel to the longitudinal axes of the blades 2 (i.e. parallel to axis Y in FIG. 1). Depth dimensions are denoted as extending in a direction which is substantially parallel to the direction of flow of compressed gas out of the compressed gas ejection assembly 10/compressed gas passage 14 (i.e. perpendicular to axes X and Y in FIG. 1). Rotor blade 2 also includes a guide assembly 16 for guiding the flow of compressed gas from the interior fluid passage 13 to the compressed gas ejection assembly 10. As shown by the dashed arrows in FIG. 3, the direction of flow of compressed gas out of compressed gas ejection assembly 10 is substantially perpendicular to the direction of flow of compressed gas through the interior fluid passage 13. The guide assembly 16 comprises a guide assembly entrance 17 in fluid communication with the interior fluid passage 13. The guide assembly 16 further comprises a guide assembly exit 18 in fluid communication with the compressed gas passage 14 in ejection assembly 10. The guide assembly 16 includes a plurality of guide walls 19 which define a plurality of guide channels 20 to smoothly guide compressed gas from the interior fluid passage 13 to the ejection assembly 10. The guide walls 19 are equally spaced and define a plurality of guide channels 20. Each guide wall 19 is curved along a path having a fixed radius of curvature from a shared centre point and a turning angle of 90 degrees.

When the mass flow of compressed gas through interior fluid passage 13 and into guide assembly 16 is constant, the velocity of compressed gas in the outer/longer guide channels is increased compared to the inner/shorter guide channels. The reason for this is that the velocity is proportional to the radius for a constant cross-sectional area and mass flow rate. It is possible to tune the velocity to a desired value by varying the cross-sectional area thereby reducing the effects of shear in the efflux.

Since mass flow is proportional to velocity, the increased velocity of compressed gas in the outer/longer guide channels results in a greater mass flow of compressed gas through the outboard side 42 of the guide assembly exit 18 compared to the inboard side 41 of the guide assembly exit 18.

Figure 4A:
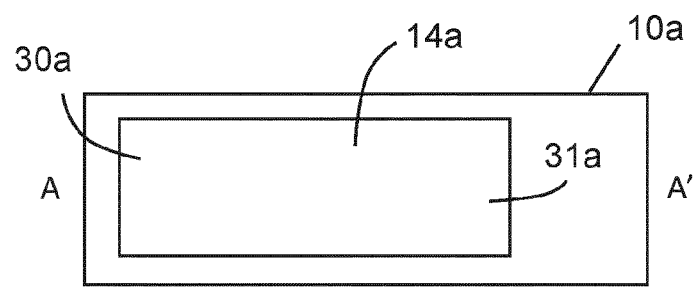
FIG. 4a shows a section through a prior art compressed gas ejection assembly.

FIG. 4a shows a cross section (effectively corresponding to section A-A' in FIG. 3) through a prior art compressed gas ejection assembly 10a including a prior art compressed gas ejection passage in the form of an aperture 14a of rectangular cross section having a constant height across its full width. This aperture shape results in a greater mass flow through the outboard-side of the aperture 31a when compared with the inboard-side of the aperture 30a which causes turbulence and energy loss.

Figure 4B:
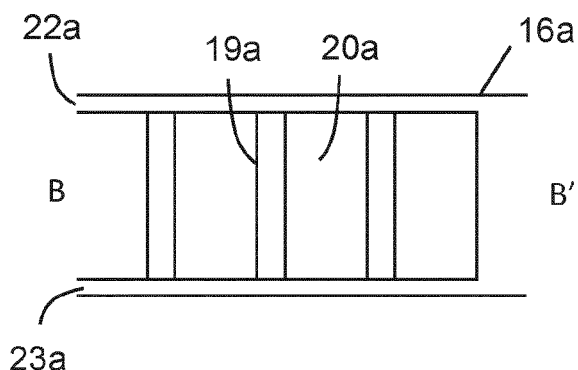
FIG. 4b shows a section through a prior art guide assembly.

FIG. 4b shows a cross section (effectively corresponding to section B-B' in FIG. 3) through a prior art guide assembly 16a in which each guide wall 19a extends between (and is attached to) an upper wall 22a and a base wall 23a. The upper and base walls 22a and 23a are parallel and all guide channels 20a have the same constant height.

Figure 5:
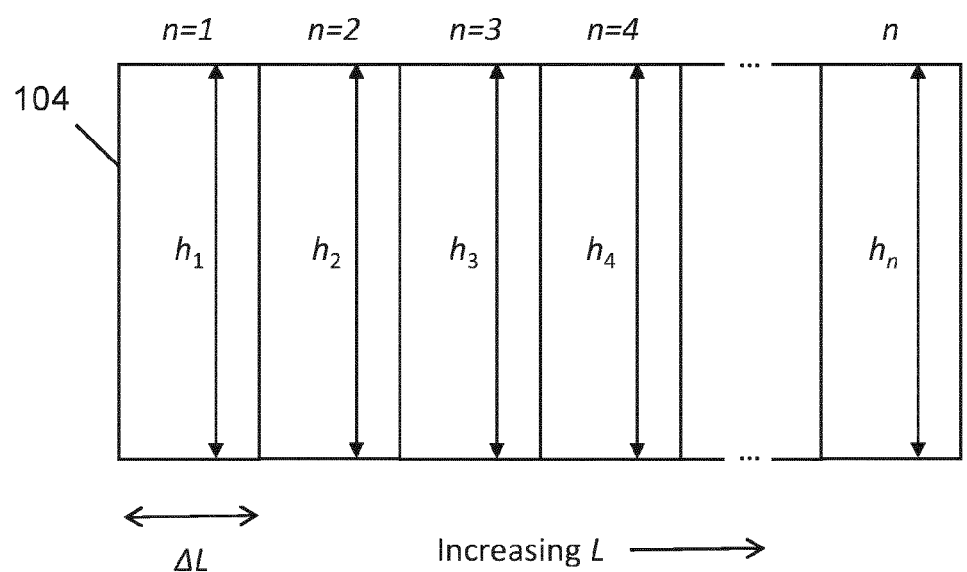
FIG. 5 shows an aperture split into n elements.

We now consider the compressed gas passage 104 of FIG. 5 which is split into n elements of constant width $\Delta L$ and varying height $h_n$. Each element n has area $A_n = \Delta L \times h_n$ and the mass flow rate M through each element n is given by $$M_n = \rho_n A_n v_n = \rho_n \Delta L \times h_n v_n, \quad (1)$$

where $\rho_n$ and $v_n$ are the density and velocity of fluid passing through element n, respectively. If we assume that in subsonic flow fluid density is constant across all elements (i.e. $\rho_n = \rho$) then for a constant mass flow through all elements (i.e. $M_n = M$), the quantity $h_n v_n$ must be constant.

In practice, the velocity v of compressed air passing through the compressed gas passage 104 increases with the length of the arc travelled between the rotor conduit and aperture (effectively the length of the larger guide wall 19 defining a guide channel 20, c.f. FIG. 3). The arc length s of each guide wall 19 is given by $s = r\theta$ where r is the radius of the guide wall 19 (i.e. the distance of the guide wall 19 from the centre point of each arc) and $\theta$ is the turn angle ($\theta = \pi/2$ for all turning vanes in this example, although other turning angles are possible). Since arc length s increases with L, we can assume that the velocity $v_n$ of compressed gas passing through element n is proportional to its distance L along compressed gas passage 14: $v_n \propto L$. This means that in order to obtain a constant mass flow for all elements n, $h_n \times L$ must be equal to a constant k, giving $$h_n = \frac{k}{L}. \quad (2)$$

In other words, for mass flow across the width of the compressed gas passage 104 to be constant, height h should reduce with increasing L.

Figure 6A:
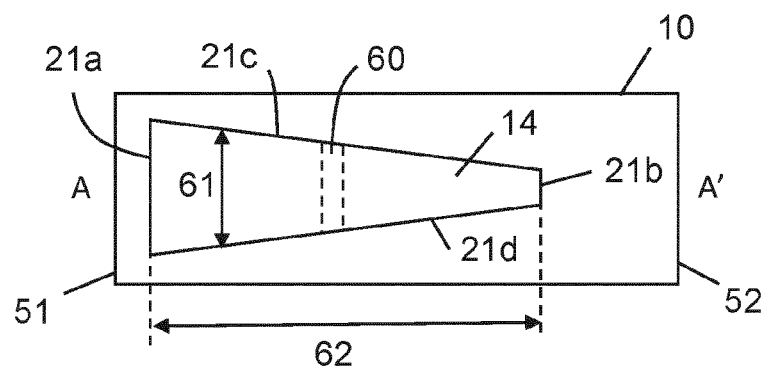
FIG. 6a shows a section through a compressed gas ejection assembly according to an aspect of the invention.

FIG. 6a, which corresponds to section A-A' in FIG. 3, shows a generally trapezoidal compressed gas passage in the form of aperture 14. The aperture 14 is defined by an upper longitudinal surface 21c, a lower longitudinal surface 21d, an outboard side surface 21b and an inboard side surface 21a. The upper and lower longitudinal surfaces 21c and 21d are adjoined to the outboard side surface 21b and an inboard side surface 21a. The outboard side surface 21b is smaller than the inboard side surface 21a; aperture 14 is narrower at the outboard side of the compressed gas passage compared to the inboard side. The height 61 of the aperture 14 (i.e. the distance between the upper and lower longitudinal surfaces 21c, 21d) is smaller on the outboard side 52 than on the inboard side 51 of the compressed gas ejection assembly 10, reflecting the changing height 61 of the fluid passage 40 along its width 62. The height 61 of aperture 14 varies linearly across the width 62 of the aperture 14 in a manner which allows a substantially constant mass flow across the full width of the aperture 14. Aperture 14 has an increased outlet area or cross section on the inboard side 51, providing a lower resistance to mass flow compared to the outboard side 52.

For the example aperture 14 of FIG. 6a, the radius of curvature of the guide walls 19 varies from 25 mm towards the inboard to 100 mm at the outboard, the full width of the aperture 14 being 100 mm and the height of the aperture 14 at the inboard being 10 mm. For the first element at the inboard $k=h_i \times L_i=10$ mm$\times$25 mm=250 mm$^2$. Using this value for k and equation (2), the height of the aperture at the outboard is $h_o=250$ mm$^2 \div 100$ mm=2.5 mm. In the example of FIG. 6a, cross section of the compressed gas entrance 24, the fluid passage 40 and the compressed gas exit 25 is constant.

Figure 6B:
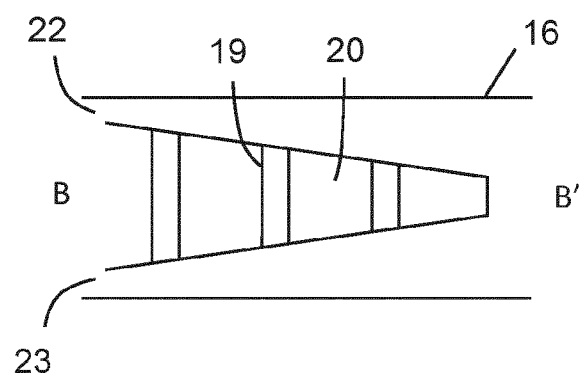
FIG. 6b shows a section through a guide assembly according to an aspect of the invention.

FIG. 6b, which corresponds to section B-B' in FIG. 3, shows in cross section a guide assembly 16 in which each guide wall 19 and guide channel 20 is located between an upper wall 22 and a base wall 23. The upper wall 22 and base wall 23 both taper towards a point and the radial cross-section through the guide assembly reflects the geometry of the asymmetric aperture 14. The distance between the upper wall 22 and base wall 23 of the guide assembly 16 allows a substantially constant mass flow across the width of the guide assembly exit 18. In the preferred embodiment, the distance between the upper and lower walls of the guide assembly 16 at the guide assembly exit 18 corresponds to the dimensions of the aperture 14b. The distance between the upper wall 22 and base wall 23 of the guide assembly 16 decreases with distance from the shared centre point for each arc of the guide walls 19.

Figure 7A:
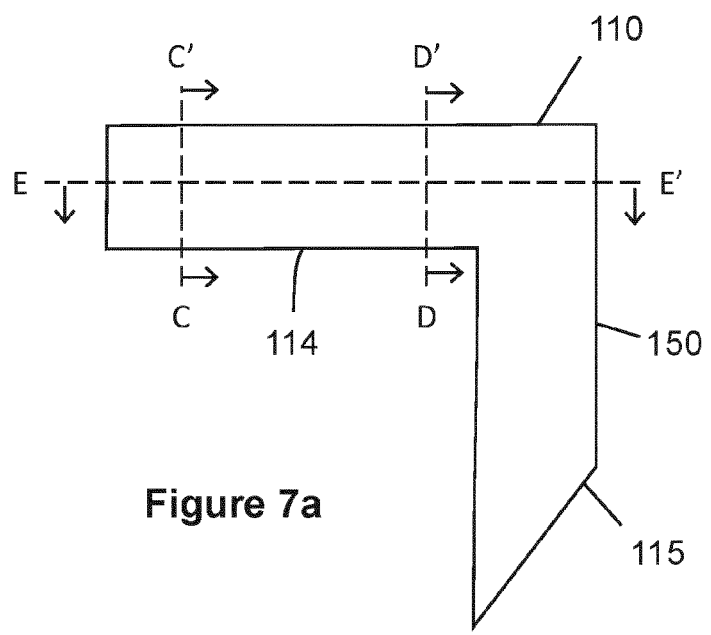
FIG. 7a shows compressed gas ejection assembly according to an aspect of the invention.

FIG. 7a shows a second embodiment of the compressed gas ejection assembly 110 for use with the blade 2/rotating wing aircraft 1/guide assembly 16. The compressed gas ejection assembly 110 comprises a compressed gas passage 114 formed in the body 150 thereof and a wing tip assembly 115. The compressed gas passage 114 is adapted to allow a substantially constant mass flow through the compressed gas ejection assembly 110 across a portion of the width of the compressed gas ejection assembly 110. The compressed gas passage 114 comprises a compressed gas entrance 124 and a compressed gas exit 125 between which fluid passage 140 is located. In use, compressed gas flows through the compressed gas ejection assembly 110 via the compressed gas entrance 124, the fluid passage 140 and the compressed gas exit 125. The compressed gas entrance 124 and compressed gas exit 125 are rectangular openings in the body 150 of the compressed gas ejection assembly 110 and the height of the fluid passage 140 (i.e. the distance between the upper and lower surfaces thereof) varies along the width and depth dimensions of the fluid passage 140.

Figure 7B:
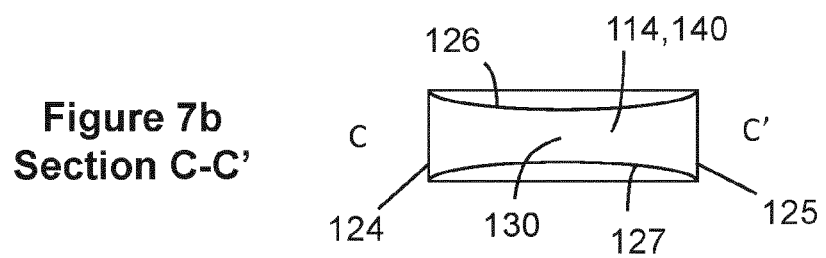
Figure 7C:
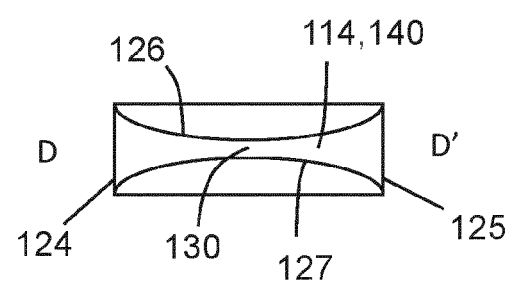
Figure 7D:
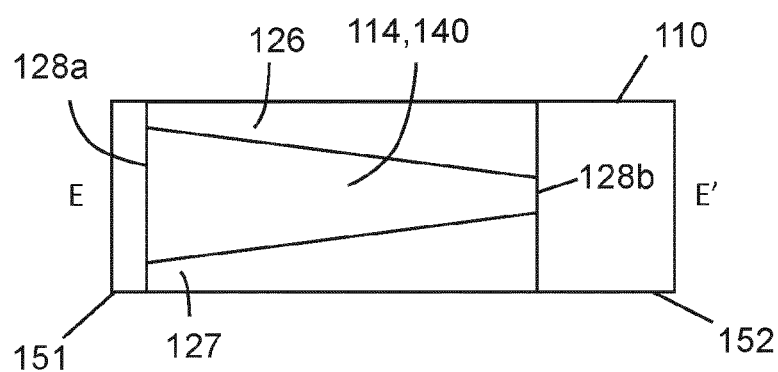

FIGS. 7b and 7c show a preferred geometry for the cross section of the compressed gas ejection assembly 110, particularly that of the fluid passage 140 between the compressed gas entrance 124 and compressed gas exit 125 (c.f. sections C-C' and D-D' in FIG. 7a). FIGS. 7b and 7c show that compressed gas ejection assembly 110 is a converging-diverging (con-di) nozzle. The con-di nozzle accelerates the inlet fluid to higher exit velocity, ideally just below sonic speed for maximum mass flow. Compressed gas entrance 124 is connected to the compressed gas exit 125 by upper nozzle surface 126, lower nozzle surface 127, an inboard-side nozzle surface 128a and outboard-side nozzle surface 128b. The upper and lower nozzle surfaces 126,127 between the entrance 124 and exit 125 are curved to provide a smooth path for compressed gas through the compressed gas ejection assembly 110. The inboard-side outboard-side nozzle surfaces 128a,128b are flat and parallel (see FIG. 7d). The smallest gap between the upper and lower nozzle surfaces 126,127 is smaller on the outboard side 152 of the compressed gas ejection assembly 110 (FIG. 7c) than on the inboard side 151 of the compressed gas ejection assembly 110 (FIG. 7b), reflecting the changing height of the fluid passage 140 along the width dimension (FIG. 7d).

The compressed gas entrance 124 and compressed gas exit 125 are rectangular openings in the body 150 of the compressed gas ejection assembly 110. The cross section of the fluid passage 140 varies smoothly from having a rectangular cross section at the compressed gas entrance 124 and the compressed gas exit 125, to having a trapezoidal cross section equal to that outlined above in relation FIG. 6a in the centre 130 of the fluid passage 140.

As will be apparent to the skilled person, the compressed gas passages 14,114 shown in FIGS. 6a-7d are merely illustrative examples of compressed gas passages according to the invention. A great number of alternative cross sections can be used to achieve the same result i.e. to obtain substantially constant mass flow across a portion of the width of the compressed gas ejection assembly 10,110. For example, the upper and lower longitudinal surfaces 21c and 21d may be curved (e.g. in a manner inversely proportional to distance from the inboard side surface in accordance with equation (2)), asymmetric or stepped. Alternatively, the compressed gas ejection means 10,110 could include a plurality of compressed gas passages 14,114/apertures/nozzles of e.g. circular or quadrilateral shape to provide a substantially constant mass flow across at least a portion of the width of the compressed gas ejection assembly 10,110. The skilled person can use trial and error and routine tests to determine whether or not a particular configuration provides a constant mass flow across a portion the width of the compressed gas ejection assembly 10,110. Mass flow through the compressed gas ejection assembly 10,110 can be measured using e.g. one or more pitot tubes at positions across the width of the compressed gas ejection assembly 10,110.

The compressed gas passage 14,114 can have any suitable dimensions and the skilled person will appreciate that a wide variety of dimensions can be chosen in accordance with the particular application of the invention. As an illustrative but non-limiting example, the width of the compressed gas passages 14,114 may be between 10 mm and 250 mm or between 50 mm and 150 mm, the maximum height of the compressed gas passages 14,114 may be between 1 mm and 100 mm or between 5 mm and 20 mm and the minimum height of the aperture may be between 0 mm and 99 mm or between 1 mm and 19 mm. The compressed gas passages 14,114 may be defined by a single continuous surface and the corners between adjoining aperture surfaces may be smooth or rounded.

The compressed gas ejection assembly 10,110 may comprise one or more pillars 60 which traverse and partially cover the compressed gas passages 14,114 and which are sufficiently narrow not to disturb the flow of compressed gas through the aperture. Pillar 60 is shown as an optional feature in FIG. 6a and traverses the fluid passage 14 from the compressed gas entrance to the compressed gas exit. Pillars 60 may be used as guides for the flow of compressed gas through the compressed gas ejection assembly 10,110, or to increase strength of the part of the body containing the compressed gas passage. The compressed gas ejection assembly 10,110 may be formed by a plate or planar sheet in which the compressed gas passage 14,114 is located, and may include at least one nozzle or sheath surrounding the compressed gas passage 14,114. Alternatively, the compressed gas ejection assembly 10,110 could be integrally formed with the guide means exit 18.

The height of each guide channel 20 may be equal and/or constant across the length and width of each guide channel 20. The width of each guide channel 20 may be constant and the entrance and exit of the guide assembly 16 may have identical cross sections. In optional embodiments, the compressed gas entrance 24 and/or compressed gas exit 25 are tapered and/or trapezoidal openings and/or reflect the dimensions of the compressed gas passage 14,114. In such embodiments, parts of the upper nozzle surface 26 and lower nozzle surface 27 may be flat, rather than curved.

In the preceding discussion of the invention, unless stated to the contrary, the disclosure of alternative values for the upper or lower limit of the permitted range of a parameter, coupled with an indication that one of the values is more highly preferred than the other, is to be construed as an implied statement that each intermediate value of the parameter, lying between the more preferred and the less preferred of the alternatives, is itself preferred to the less preferred value and also to each value lying between the less preferred value and the intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof.

The invention claimed is:

1. A compressed gas ejection means non-movably located on a trailing edge of a rotating wing aircraft blade, the compressed gas ejection means comprising a compressed gas passage means, the compressed gas passage means being adapted to allow a substantially constant velocity of compressed air flowing through the compressed gas ejection means across substantially the entire width of the compressed gas passage means, wherein the rotating wing aircraft comprises a compressor for producing compressed air for the compressed gas ejection means, wherein the compressed gas ejection means comprises a guide means for guiding compressed air from the compressor through a turn to the compressed gas passage means, wherein the guide means comprises a plurality of guide channels and wherein the cross-sectional areas of the plurality of guide channels are adapted to allow a substantially constant velocity of compressed air flowing through the compressed gas ejection means across substantially the entire width of the compressed gas passage means.

2. A compressed gas ejection means according to claim 1, wherein the height of the compressed gas passage means varies across the width of the compressed gas passage means.

3. A compressed gas ejection means according to claim 2, wherein the height of the compressed gas passage means decreases with distance from an inboard side of the compressed gas ejection means.

4. A compressed gas ejection means according to claim 1, wherein the compressed gas passage means comprises at least one compressed gas entrance and at least one compressed gas exit.

5. A compressed gas ejection means according to claim 4, wherein the compressed gas passage means comprises at least one fluid channel and wherein the at least one fluid channel provides a fluid communication path between at least one compressed gas entrance and at least one compressed gas exit.

6. A compressed gas ejection means according to claim 5, wherein the at least one fluid channel comprises the upper longitudinal surface, the lower longitudinal surface, an outboard side surface and an inboard side surface.

7. A compressed gas ejection means according to claim 6, wherein the distance between the upper and lower longitudinal surfaces is smaller towards the outboard side of the compressed gas ejection means compared to the inboard side of the compressed gas ejection means.

8. A compressed gas ejection means according to claim 5, wherein the at least one fluid channel is an aperture.

9. A compressed gas ejection means according to claim 5, wherein the compressed gas ejection means comprises a plurality of apertures.

10. A compressed gas ejection means according to claim 5, wherein the at least one fluid channel is a nozzle.

11. A compressed gas ejection means according to claim 10, wherein the at least one fluid channel is a converging-diverging nozzle.

12. A compressed gas ejection means according to claim 11, wherein the height of the one or more fluid channels varies over the width of the converging-diverging nozzle.

13. A rotating wing aircraft blade comprising a compressed gas ejection means according to claim 1.

14. A rotating wing aircraft blade according to claim 13, wherein the rotating wing aircraft blade comprises an interior fluid passage for compressed gas.

15. A rotating wing aircraft blade according to claim 14, wherein each of the plurality of guide channels comprises a plurality of equally spaced guide walls.

16. A rotating wing aircraft blade according to claim 15, wherein the guide means comprises a guide means exit in fluid communication with the compressed gas ejection means, wherein the compressed gas ejection means is integrally formed with the guide means exit.

17. A rotating wing aircraft comprising at least one rotating wing aircraft blade according to claim 13.

18. A rotating wing aircraft according to claim 17, wherein the rotating wing aircraft is a reaction jet helicopter.

* * * * *